US006723670B2

(12) United States Patent
Kajander et al.

(10) Patent No.: US 6,723,670 B2
(45) Date of Patent: Apr. 20, 2004

(54) COATED NONWOVEN FIBER MAT

(75) Inventors: Richard Emil Kajander, Toledo, OH (US); Alan Michael Jaffee, Bowling Green, OH (US); Glenda B. Bennett, Toledo, OH (US)

(73) Assignee: Johns Manville International, Inc., Denver, CO (US)

( * ) Notice: Subject to any disclaimer, the term of this patent is extended or adjusted under 35 U.S.C. 154(b) by 90 days.

(21) Appl. No.: 09/923,932

(22) Filed: Aug. 7, 2001

(65) Prior Publication Data

US 2003/0032350 A1 Feb. 13, 2003

(51) Int. Cl.[7] .............................. B32B 5/18; B32B 5/24
(52) U.S. Cl. ................... 442/374; 442/76; 428/311.11; 428/316.6; 428/319.1; 428/308.4
(58) Field of Search ........................ 442/76, 180, 149, 442/331, 374; 428/304.4, 305.5, 311.11, 311.51, 308.4, 316.6, 319.1

(56) References Cited

U.S. PATENT DOCUMENTS

| 3,874,980 | A |   | 4/1975  | Richards et al. ............... 161/41 |
|-----------|---|---|---------|---------------------------------------|
| 4,028,158 | A |   | 6/1977  | Hipchen et al. ............... 156/79  |
| 4,073,997 | A |   | 2/1978  | Richards et al. .............. 428/285 |
| 4,169,915 | A |   | 10/1979 | Heitmann et al. ........... 428/310    |
| 4,186,236 | A |   | 1/1980  | Heitmann .................... 428/291  |
| 4,596,737 | A |   | 6/1986  | Werbowy et al. ............ 428/228    |
| 4,606,944 | A | * | 8/1986  | Lauchenauer ............... 427/296    |
| 4,681,798 | A | * | 7/1987  | Gill et al. .................... 428/215 |
| 4,690,859 | A | * | 9/1987  | Porter et al. .................. 442/68 |
| 5,112,678 | A |   | 5/1992  | Gay et al. ................... 428/268  |
| 5,219,620 | A | * | 6/1993  | Potter et al. .............. 427/434.2  |
| 5,501,895 | A |   | 3/1996  | Finley et al. ................. 428/194 |
| 5,514,417 | A |   | 5/1996  | Matthews et al. ........... 427/358    |
| 5,527,598 | A |   | 6/1996  | Campbell et al. ............ 428/251   |
| 5,578,363 | A |   | 11/1996 | Finley et al. ................ 428/194  |
| 5,698,302 | A |   | 12/1997 | Brandon et al. ............. 428/215   |
| 5,698,304 | A |   | 12/1997 | Brandon et al. ............. 428/215   |
| 5,955,013 | A |   | 9/1999  | Grinshpun et al. ......... 264/45.5    |
| 5,965,257 | A |   | 10/1999 | Ahluwalia ................... 428/357   |
| 5,981,406 | A | * | 11/1999 | Randall ........................ 442/71  |
| 6,008,147 | A | * | 12/1999 | Jaffee ......................... 442/331  |
| 6,187,697 | B1|   | 2/2001  | Jaffee et al. ................. 442/149  |

FOREIGN PATENT DOCUMENTS

WO        WO0076932         12/2000

OTHER PUBLICATIONS

U.S. Published Pat. Application No. 20030032351 Horner et al, Filed Apr. 8, 2002.

* cited by examiner

Primary Examiner—Terrel Morris
Assistant Examiner—Hai Vo
(74) Attorney, Agent, or Firm—John D. Lister

(57) ABSTRACT

A new foam coated nonwoven fibrous mat having properties particularly suited for a facer on gypsum wallboard, laminates made therefrom and the method of making the mat is disclosed. The mat preferably contains a major portion of glass fibers and a minor portion of a resinous binder. The foam coating is permeable and reduces fiber dust and abrasion experienced in the past with relatively coarse, relatively inexpensive glass fibers in the mat. Contrary to previous methods, the foam coated fibrous mat is made in-line on a wet mat forming production line by applying a wet foam binder onto a wet, fibrous web followed by drying and curing in-line.

22 Claims, 6 Drawing Sheets

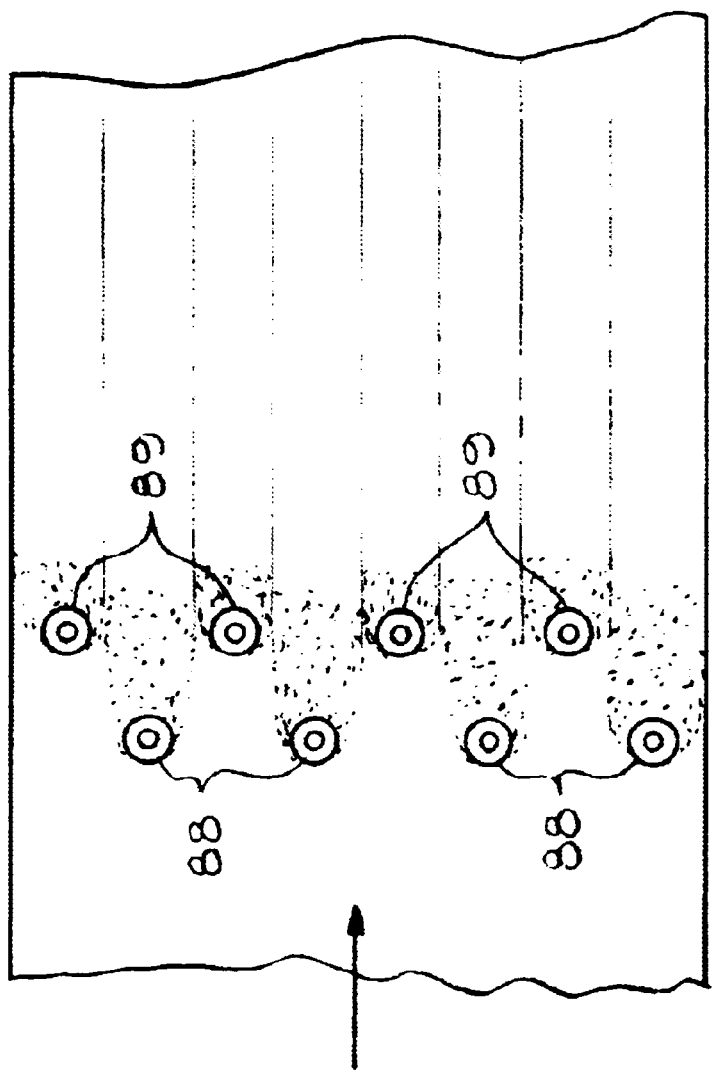

COATED NONWOVEN FIBER MAT

BACKGROUND OF THE INVENTION

The present invention involves a process of coating a non-woven fiber glass mat with foam or froth on the same wet process line used to make the mat, as an intermediate step in the mat manufacturing process, and the foam coated fiber glass mat products that result. These coated mats have many uses, but are especially useful as a facing on a gypsum wallboard for exterior application and on which stucco is applied.

Fibrous non-woven mats are often formed into a wet mat from an aqueous dispersion of fibers such as glass and/or synthetic organic fibers can include other fibers such as cellulose fibers, ceramic fibers, etc. and can also include particles of inorganic material and/or plastics. Usually a solution of urea formaldehyde resin, usually modified with a thermoplastic polymer, or one of many other known resin binders is applied to a the wet non-woven web of fibers and then, after removing excess binder and water, the bindered web is dried and heated further to cure the urea formaldehyde resin or other resin binder to form a non-woven mat product. A typical process is disclosed in U.S. Pat. Nos. 4,112,174 and 3,766,003, the disclosures of which are hereby incorporated herein by reference.

The fiber glass mat (Johns Manville's 7502 Mat—2 lb./100 sq. ft.) made using a binder of urea formaldehyde performed good in the process disclosed in U.S. Pat. No. 4,647,496 to make a faced insulating gypsum board, also disclosed in that patent, but the mat was not as strong as desired which caused process breakouts adding to production costs. This mat was also more rigid than desired which made it difficult to fold around the edges of the board and also irritated the hands and arms of the workers handling and installing the insulating board product. Further, when the faced insulated gypsum board was cut, the dust from the mat was excessive and further irritated those it contacted, particularly if the workers bare arms, etc. were sweaty and exposed to the dust. Skin abrasion and irritation was also a problem for those handling the mat and the faced board when not wearing gloves and long sleeve shirts.

To address the inadequate strength problem a small portion of polyester, polyethylene terathalate (PET), fibers were used in place of an equal amount of glass fibers and the urea formaldehyde resin binder was replaced with an acrylic binder containing a small amount of a stearylated melamine. This improved the strength adequately and also improved the handling characteristics of the mat somewhat, i.e. the mat is more friendly to those handling and installing the mat or board, but the acrylic bound mat is more expensive and less fire (flame) resistant. Such mats are disclosed in U.S. Pat. No. 5,772,846. While the mats disclosed by this latter reference have substantially improved "hand" and cause very little abrasion or discomfort in handling, the cost is higher, the mat is less flame resistant than the mat disclosed in U.S. Pat. No. 4,647,496 and further improvement is still desired by some users.

There still exists a need for a nonwoven fiber glass mat that has better flame resistance, lower cost and good handlability (flexibility and non abrasive/non irritating to the skin).

BRIEF SUMMARY OF THE INVENTION

It is an object of the present invention to provide a foam or froth coated nonwoven fibrous mat useful as a facer on gypsum insulating board of the type described in U.S. Pat. No. 4,647,496 having one or more of improved handling characteristics, improved flame resistance, improved flexibility and product that produces less, or less irritating, dust when the faced gypsum board is cut than the mats used heretofore for facing insulating gypsum board.

It is a further object of the present invention to provide flexible mats containing a major portion of less expensive chopped glass fibers that can be used for facing gypsum wall board and other products.

It is a further object to provide a low cost method of making a foam faced fibrous non-woven mat on a wet process line without having to coat a dried mat either in-line or off-line and without having to dry the mat a second time.

The present invention includes a method of making a foam coated fibrous non-woven mat where the fibers are preferably, but not necessarily, bonded together with a conventional mat binder comprising using a wet process to form a wet non-woven web from a low concentration aqueous slurry followed by partially dewatering the mat, preferably, but not necessarily, adding an excess of aqueous resin binder, removing some but not all of the binder, then applying an aqueous foam or froth having a high air content and a high blow ratio, onto the top of the wet mat in-line, and then heating the mat to remove the water, and preferably to cure the binder, and set the foam coating. The aqueous foam slurry contains a foam that breaks down fairly quickly such that the mat has enough permeability to allow drying air to penetrate the mat. The foam coating will hold the non-woven fibrous web together adequately for some applications, but it is preferred to use a conventional binder in a conventional manner to give the non-woven finished mat greater strength. The aqueous foam is foam having a blow ratio of at least 15, preferably at least 25, and most preferably between 15 and 30, a viscosity of at least 200 centipoise, preferably at least 500 centipoise, and have rapid heat breaking and non-draining characteristics.

The present invention also includes the mats made by the above process, or a different process wherein foam is applied to wet mat in-line, comprising a non-woven fibrous mat with the fibers bound together with a resinous binder and having a dry foam coating on one surface of the mat, the dry foam coating preferably being permeable to allow the mat to breathe and to allow later coatings to penetrate the foam coating. The foam layer may penetrate into the non-woven fibrous mat a distance that is a small fraction of the total thickness of the mat. This mat is very useful as a facer for many products, particularly gypsum wallboard and insulating boards of various kinds. The foam coating ties up the fibers preventing loose fibers from or fiber ends from getting on people handling and/or installing the product faced with the foam coated mat and causing irritation and/or itching. The foam forming the foam coating on the mat can contain fire retardant or intumescent material, adhesives, colorants and/or other materials for changing the appearance or performance of the mat surface.

The present invention also includes laminates comprising a base layer such as gypsum wallboard or insulating boards, fiberglass blanket, plywood or other wood product having adhered thereto a foam coated fibrous non-woven mat as described above.

Preferably the inventive mat for facing the insulating gypsum board has a basis weight within the range of about 1.5 and about 3, preferably within the range of about 1.8–2.5 pounds per 100 square feet, most preferably about 2.2–2.4 pounds per 100 sq. ft. Preferably the binder content of the dried and cured mats is within the range of about 15 wt. percent and about 25 wt. percent, most preferably about 20–25 wt. percent, based on the weight of the finished mat. Preferably the inventive mat contains a major portion of glass fibers, but can also contain a minor portion of polymer fibers, such as PET polyester fibers, cellulosic fibers like wood pulp, and ceramic fibers, bound together with a minor portion of a conventional modified urea formaldehyde binder. Other conventional binders can be used instead of the modified UF binder such as a phenolic resin, a melamine formaldehyde, a furfuryl alcohol, a latex containing a mixture of a cross linked vinyl chloride acrylate copolymer having a glass transition temperature as high as about 113 degrees F., preferably about 97 degrees F., and a small amount of a stearylated melamine and other conventional mat binders.

When the word "about" is used herein it is meant that the amount or condition it modifies can vary some beyond that so long as the advantages of the invention are realized. Practically, there is rarely the time or resources available to very precisely determine the limits of all the parameters of ones invention because to do would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors disclosure and understanding the inventive concept and embodiments disclosed including the best mode known to the inventor, the inventor and others can, without inventive effort, explore beyond the limits disclosed to determine if the invention is realized beyond those limits and, when embodiments are found to be without any unexpected characteristics, those embodiments are within the meaning of the term about as used herein. It is not difficult for the artisan or others to determine whether such an embodiment is either as expected or, because of either a break in the continuity of results or one or more features that are significantly better than reported by the inventor, is surprising and thus an unobvious teaching leading to a further advance in the art.

DESCRIPTION OF THE DRAWINGS

FIG. 6 is a partial plan view of the system shown in FIG. 5 taken along lines 6—6 showing how foam applying nozzles are positioned.

DETAILED DESCRIPTION OF THE INVENTION

It is known to make reinforcing nonwoven mats from glass fibers and to use these mats as substrates in the manufacture of a large number of roofing and other products. Any known method of making nonwoven mats can be used in this invention, such as the conventional wet laid processes described in U.S. Pat. Nos. 4,129,674, 4,112,174, 4,681,802, 4,810,576, and 5,484,653, the disclosures of each being hereby incorporated herein by reference. In these processes a slurry of glass fiber is made by adding glass fiber to a typical white water in a pulper to disperse the fiber in the white water and to form a slurry having a fiber concentration of about 0.2–1.0 weight %, metering the slurry into a flow of white water to dilute the fiber concentration to 0.1 wt. percent or less, and continuously depositing this mixture onto a moving screen forming wire to dewater and form a wet nonwoven fibrous mat. This wet nonwoven mat is then conveyed through a binder application where an aqueous resinous binder is applied in excess, the surplus is removed by suction and the wet, bindered mat is then dried and the binder cured to form a nonwoven mat product.

The method of the present invention comprises a modification to the binder application portion of otherwise conventional mat making processes by adding a second applicator for applying a foam coating. Most nonwoven mat processes and forming machines are suitable for modification and use with the present invention, but preferred are the wet laid nonwoven mat processes and machines wherein an aqueous slurry containing fibers is directed onto a moving permeable screen or belt called a forming wire to form a continuous nonwoven wet fibrous mat.

Figure 1:
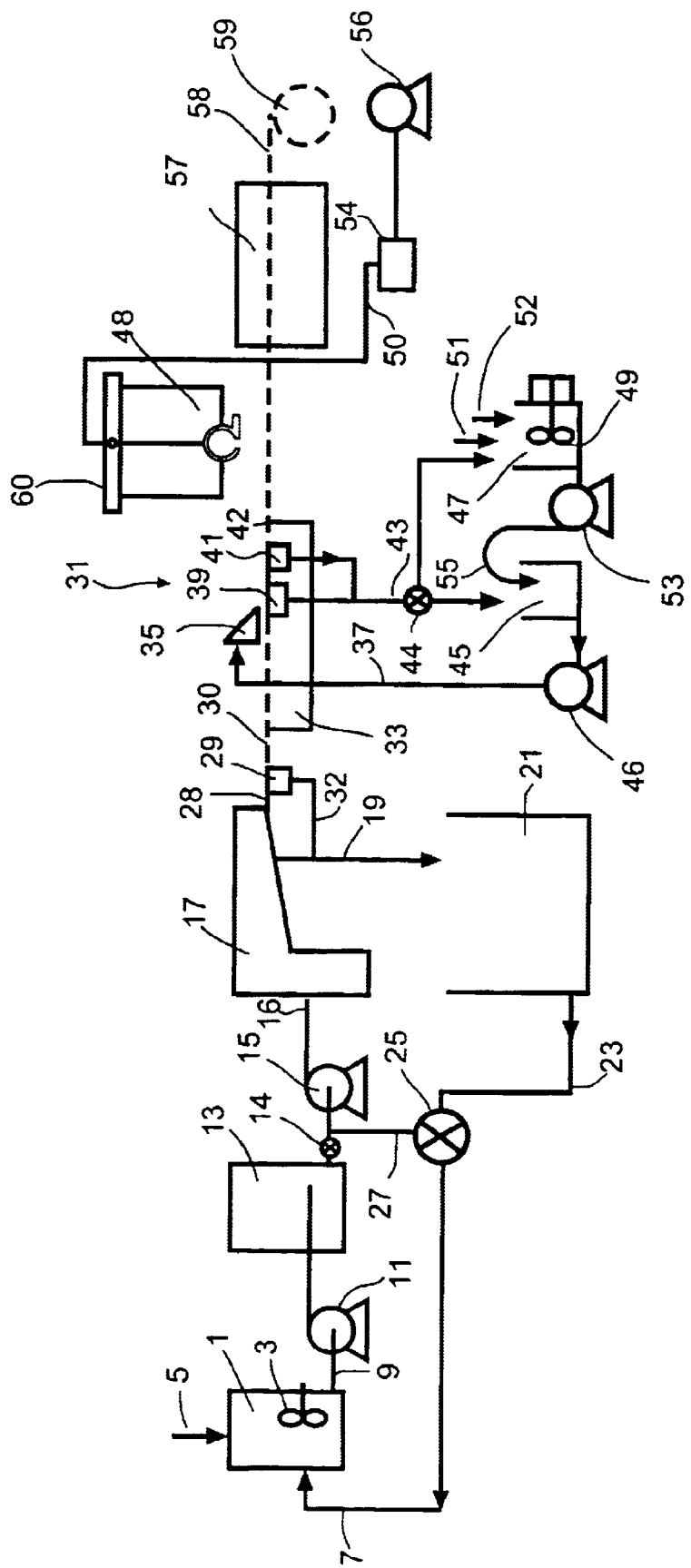
FIG. 1 is a schematic of a conventional wet mat process line having a curtain coater binder applicator and a foam applicator, for practicing the present invention.

FIG. 1 is a schematic of a preferred wet laid system for practicing the invention. Fibers 5 are fed continuously at a controlled rate into a pulper 1 along with a conventional whitewater through a pipe 7, also continuously and at a controlled rate. An agitator 3 in the pulper 1 mixes and disperses the fibers in the whitewater. The resultant concentrated fibrous slurry flows continuously through a pipe 9 into an optional pump 11 that pumps the concentrated slurry into a fiber slurry holding tank 13. The concentrated fiber slurry is preferably metered continuously from the holding tank 11 with a valve 14 and into a metered flow of deaired whitewater 27 to form a diluted fibrous slurry. The valve 25 meters a correct rate of deaired whitewater to the pulper 1 via pipe 7 and a correct rate of deaired whitewater 27 to form the diluted fiber slurry. The diluted fibrous slurry flows into pump 15 and is pumped to the mat forming machine 17, which can be of any width and typically is wide enough to make a finished mat 12 feet wide or wider. Alternative forming methods for making the body portion of the nonwoven mat include the use of well known paper or board making processes such as cylinder forming, dry forming or air laid, etc.

The preferred processes for the production of mats of the present invention are those known processes using mat forming machines 17 like a Hydroformer™ manufactured by Voith—Sulzer of Appleton, Wis., or a Deltaformer™ manufactured by North County Engineers of Glens Falls, N.Y. In these machines, the diluted fiber slurry flows horizontally against an inclined moving permeable belt or forming wire (not shown) where the fiber is collected and builds up in a random pattern to form a wet fibrous mass 28 while the whitewater passes through the forming wire becoming somewhat foamy (due to contained air) and is transported to a deairing tank 21 via pipe 19. The wet fibrous mass 28 is dewatered to the desired level with a suction box 29 to form a wet fibrous web 30. The foamy whitewater removed is piped through pipe 32 to the deairing tank 21, preferably via the pipe 19.

This wet nonwoven fibrous web 30, the body portion, is then preferably, but not necessarily, transferred to a second moving screen 33 and run through a dual application section 31 where first an aqueous binder mix is applied to the mat in any one of several known ways. An aqueous binder is pumped at a controlled rate from a binder mix holding tank 45 via a controlled rate pump 46 such that more binder than is needed is fed through a pipe 37 to a binder applicator such as a curtain coater 35 where the binder slurry is applied in excess to the wet web 30. Other types of conventional applicators can be used to apply the binder in a known manner.

The aqueous binder mix is prepared by feeding one or more aqueous resin binders 52 at a desired rate to a binder mix tank 47 having an agitator 49 therein to mix the aqueous binder(s) 52 to form a binder mix. Fibers or particles, such as microfibers, pigments, filler, etc., can also be added to the binder mix tank 47. The binder mix or slurry is then pumped to the binder holding tank 45 with a metering pump 53 and pipe 55. A metering pump 46 pumps binder mix, mixed with returned excess binder via line 43 from suction boxes 39 and 41, through line 37 to the binder applicator 35 and speeds up and slows down the pumping rate with the speed of the mat line or windup 59. The resin content in the binder mix and the degree of vacuum in the suction boxes 39 and 41 are varied to control and obtain the desired binder resin content of the mat in a known manner.

The binder mix can be prepared continuously or in batches as is well known. When prepared continuously, all ingredients of the mix are carefully metered in known ways to insure that the desired composition of the finished mat is maintained.

When the aqueous binder mix is applied to the wet nonwoven web 30 (FIG. 2), the binder mix will saturate the wet nonwoven fibrous mat. Preferably, excess aqueous binder slurry is applied using the curtain coater 35, such as supplied by North County Engineers of Glens Falls, N.Y., but other known methods of application and equipment that will also handle the particles and/or fibers in the binder and that will apply this at the rate required to the top of the wet body portion of the mat will work.

Figure 2:
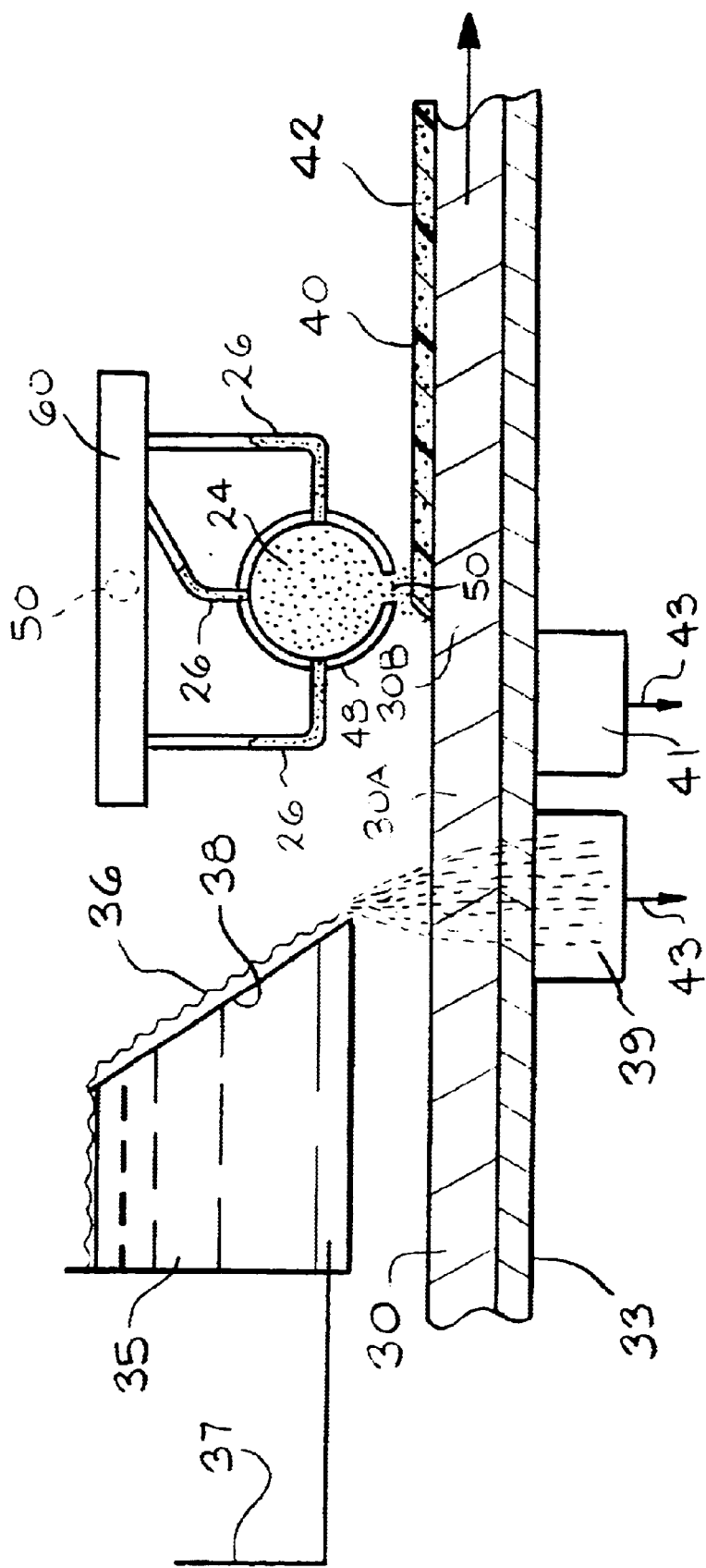
FIG. 2 is a schematic cross section of a portion of the process line of FIG. 1 showing the binder application portion and the foam application portion according to the present invention.

As shown in FIG. 2, the binder mix flows over a lip of an inclined surface 38 of a curtain coater type of the binder applicator 35 and onto the wet web 30. As shown, the aqueous binder mix flows into the wet web 30 also coating at least portions of the fibers in the body portion 30 and the excess aqueous binder portion flows out of the wet web 30, through the permeable belt 33 and into a first suction box 39. The binder saturated web 30A is then run over a second, or more, suction box 41 while still on the moving permeable belt 33 to remove excess binder to form a wet, bindered nonwoven web 30B containing the desired amount of aqueous binder. The excess binder mix that is removed is returned to the binder mix tank 47, and/or to the binder holding tank 45, via pipe 43.

A second applicator, a foam applicator 48 is mounted just downstream from of the second suction box 41, but above the permeable belt 33 and the wet, bindered web 30B, in a similar manner as the binder applicator 35. The foam applicator 48 can be any foam coater applicator, but preferably is a conventional pipe slot applicator 48. An aqueous foam according to the present invention is prepared in foam generator 54 using a high shear type mixer such as a pinned drum mixer or foam generator available from Gaston Systems, Inc. of Stanley, N.C., or Lessco Company of Dalton, Ga., or any suitable equivalent foam generator for this purpose and forced to the foam applicator 48 through line 50 which divides into multiple lines 26 that enter the foam applicator 48 spaced along and around the pipe slot applicator 48. A positive displacement pump 56, which can be any type of positive displacement pump, pumps an aqueous foam precursor into the foam generator 54 and the high shear action inside the foam generator 54 produces foam 24 whose pressure due to expansion forces the foam through the lines 50 and 26 into the applicator 48 where it is extruded through a slot 50 onto the top surface of the moving wet, bindered web 30B to form a foam coating 40 and a foam coated, bindered, fibrous web 42. The rate of foam extrusion through the slot 50 is controlled by the pumping rate of the positive displacement pump 56. The foam applicator 48 can have an optional foam smoothing lip 51 adjacent the downstream side of the slot 50 for purposes of controlling the height of the foam layer 40 and for smoothing the top surface of the foam layer 40.

As can be seen, the foam penetrates the top of the wet, bindered web 30B slightly. The type of foam used is carefully selected and controlled to prevent the foam from penetrating further into the wet, bindered web 30B. Foam coating has an advantage, because of its very high viscosity under low shear, i.e. it sits on top of the wet web without excessive penetration after application. The aqueous binder in the bindered web 30B also helps prevent deeper penetration by the foam. The application rate of foam to the wet, bindered web 30B, and thus the thickness of the foam layer or coating 40, is controlled by the controlling the speed of the permeable belt 33 and the rate of foam pumped to the foam applicator 48 by the foam pump 54.

The foam coated, wet, bindered web 42 is next transferred to a moving conventional permeable, oven belt (not shown) in a known manner and run through an oven 57 to dry the wet web 42 and to cure (polymerize) the polymeric based resin binder which bonds the fibers together forming the finished inventive foam coated fibrous mat 58 which can be wound into a roll 59 using conventional mat winding equipment. The mat is heated to temperatures of up to about 500 degrees F. in an oven, depending on the type of binder used and/or the nature of the foam on the surface, but other types of dryers and heaters can be used also such as sequential can dryers, a honeycomb oven roll and other ovens used in the art of manufacturing fibrous, non-woven mats.

Preferrably the foam is applied to a wet, bindered web to produce a foam coated binder bound fibrous mat, but the binder is optional. Foam can be applied to a wet web containing no binder in which case the fibers are held together by the foam layer on one surface of the mat while the opposite portion of the mat contains no added binder. Nevertheless, the resultant mat has enough strength to enable it to be wound up and unwound for use in making a mat faced laminate. In this latter case, the foam, wet gypsum mix, or other base laminate material penetrates the unbound fiber portion of the mat and bonds the fibers together while also bonding the mat to the base layer.

The fibers, or fibers and particles, in the web portion of the mats of the present invention preferably constitute about 40–80 wt. percent of the total weight of the mat and the foam coating on the mat amounts to about 5–35 wt. percent of the mat. The resin binder content of the mats can vary greatly, but usually is about 10–30 wt. percent of the foam coated mats of the present invention. A preferred coated mat of the present invention contains about 70+/−5 wt. percent fibers, about 20+/−3 wt. percent binder holding the fibers together and about 10+/−5 wt. percent foam coating.

Preferably, the majority of the fibers are glass fibers and most preferably all the fibers are glass fibers, but this invention is equally applicable to ceramic, natural, like wood pulp, manmade cellulosic fibers and polymer fibers and to nonwoven webs made from mixtures of any combination of these types of fibers. While the majority of the fibers are glass fibers in the preferred body portion, all or any portion of non-glass fibers can also be included, such as man made or natural organic fibers like Nylon™, polyester, polyethylene, polypropylene, cellulose or cellulose derivatives, etc.

The fibers used in the nonwoven mat should be at least 0.25 inch long or longer, more preferably at least one-half inch or three-quarters inch long and most preferably at least about one inch long, but mixtures of fibers of different lengths and/or fiber diameters can be used as is known. It is preferred that these fibers be coated with a silane containing size composition as is well known in the industry.

The glass fibers can be E, C, A, T, S or any known type glass fiber of good strength and durability in the presence of moisture and mixtures of lengths and diameters. Fibers of any diameter can be used, but the preferred fibers are K 137 (about 13 micron average diameter) or M 137 (about 16 micron average diameter) and 117K or M 117 E glass fibers available from Johns Manville International, Inc. of Denver, Colo., but most commercially wet chop glass fiber products are be suitable. A substantial advantage of the present invention is that it enables the use of larger fiber diameters, which are less expensive, while producing a faced product that has a surface that is "user friendly" and non abrasive. Larger fiber diameters have caused irritation problems in past facer products causing the industry to shift to more costly, smaller diameter fibers like H or G fibers (about 10 or 9 microns average diameter).

The binder used to bond the fibers together can be any conventional binder capable of bonding the fibers together. A wide variety of binders are used to make nonwovens with urea formaldehyde (UF), acrylic resin, melamine formaldehyde (MF), polyester, acrylics, polyvinyl acetate, and urea formaldehyde and melamine formaldehyde binders modified with polyvinyl acetate and/or acrylic being typically used.

The foam used to make the foam coating of the two layered mat should not penetrate substantially into the aqueous resin binder slurry, but could penetrate slightly. The foam should have a very high blow ratio (or low cup weight, i.e. grams per liter), the density of the foam precursor divided by the density of the wet froth or foam, forming a very dry froth. The blow ration should be at least 12 and preferably at least 25, most preferably about 15–30 such as 15–18. The foam must be extremely non-draining, for example when a one liter Imhoff cone is filled with the wet froth or foam and allowed to stand for 16 hours, less than 5 millimeters and preferably less than 2 millimeters of liquid should collect in the bottom of the cone. The foam should be rapid breaking when exposed to heat due either to the nature of the resin in the foam or the amount of inert fillers in the foam, and not form an impermeable film during drying. The foam, when it breaks during drying, should have a viscosity of at least 200 centipoise and preferably at least 500 centipoise, with a viscosity in the range of about 200 to about 600 being preferred, so that the broken foam does not penetrate too far into the fibrous web substrate. One suitable foam is TN-599 available from B.F. Goodrich of Brecksville, Ohio. Another suitable foam is used in the following example.

The type of foam should be selected according to the parameters provided above and the rate of application should be controlled such that the permeability of the foam coated mat is at least 150–200 cubic feet per minute per square foot (CFM/sq. ft.). More preferably the permeability of the foam coated mat is at least 350 and most preferably at least 500 CFM/sq. ft. Where the foam is applied by continuous extrusion, such as in FIGS. 2 and 3, the foam should be applied at a velocity that approximates the linear speed of the wet web for best results. The importance of permeability in the foam coated mat is to allow penetration of the material being used to adhere the foam coated surface to another medium, such as an adhesive used to bond a scrim, decorative facing or other material to the foam coated surface of the mat. Another important consideration in certain applications such as when used to face certain insulation media is that the permeability allows the product to "breath", i.e. to pass air or other gases through the mat facer. Lower permeability can be preferred if drying is done by can or impingement ovens, rather than with a through air oven.

Figure 3:
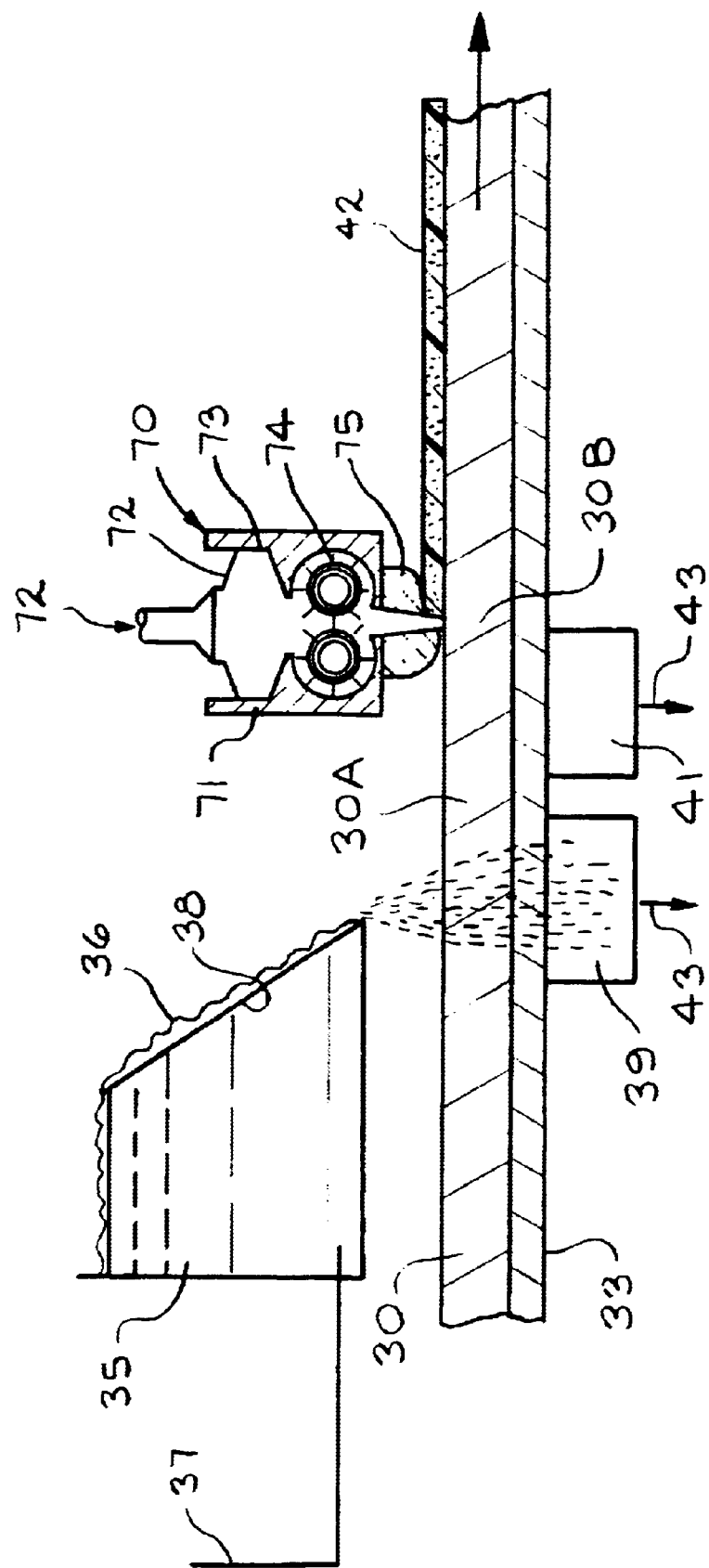
FIG. 3 is a schematic cross section of a portion of the process line of FIG. 1 showing the binder application portion and another embodiment of a foam application portion according to the present invention.

FIG. 3 shows another embodiment of applying foam to the wet mat according to the present invention. This embodiment is the same as the embodiment shown in FIG. 2 except for the binder applicator used. In this embodiment, a foam extruder 70 is used, such as a Zimmer Variopress foam applicator available from J. Zimmer Maschinenbau Ges. GmbH of Klagenfurt, Germany. The foam 72, as described above, enters the Variopress foam applicator 70 from above after being pumped in the manner described in the description of FIG. 2 above. The foam 72 flows by gravity down through the foam applicator housing 71 and into two counter rotating gears 73,74, which pump the foam at a desired and controlled rate through an extrusion die 75 and onto the wet, bindered mat 30B to form the foam coating 42. The gear 73 rotates clockwise and the gear 74 rotates counter clockwise. The speed of rotation of the gears 73,74, is variable and can be changed to deliver the desired rate of foam onto the wet, bindered mat 30B according to the linear speed of the wet, bindered mat 30B and the desired coating thickness or foam loading of the foam coating 42. The Variopress foam applicator can be raised and lowered in any suitable manner to optimize the application of the foam onto the wet, bindered mat 30B. The Variopress foam applicator 70 preferably spans completely across the width of the mat 30B, but need not if only a portion of the width of the mat 30B is to be coated with foam.

Figure 4:
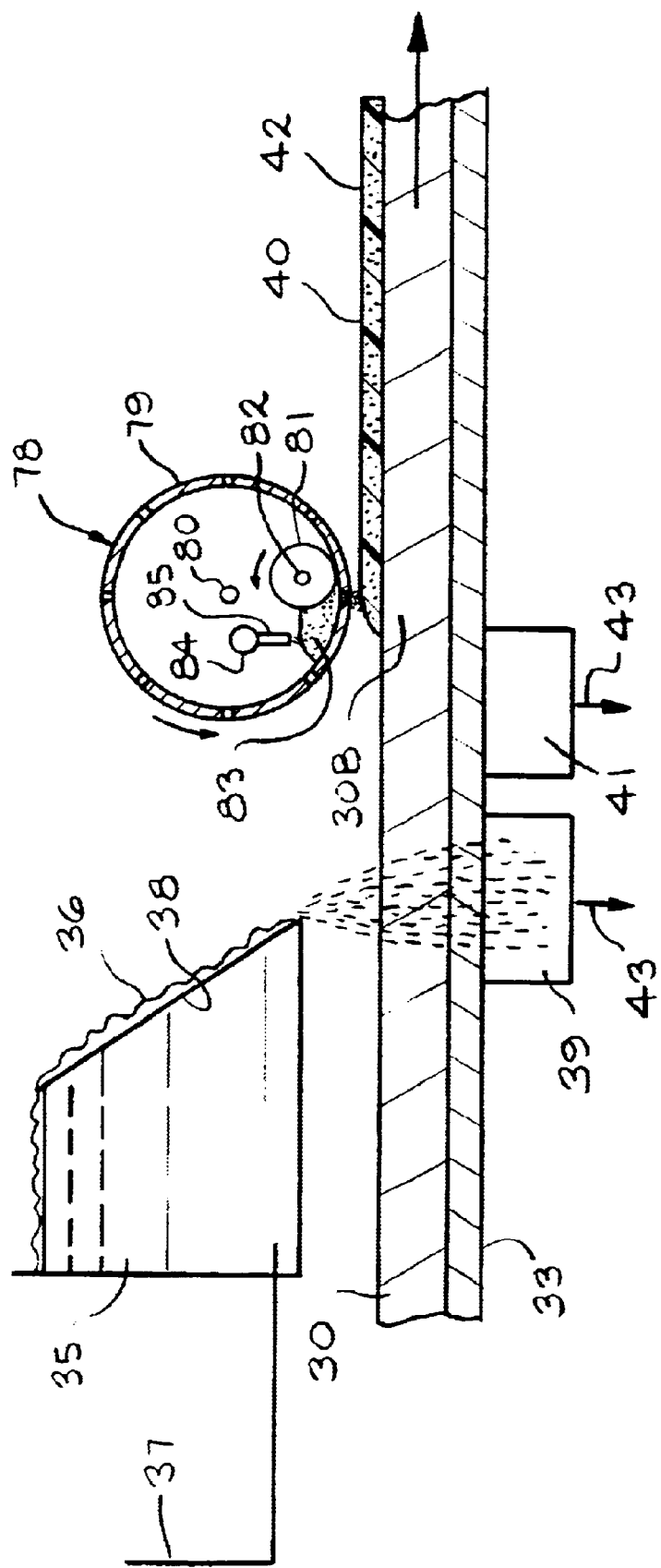
FIG. 4 is a schematic cross section of a portion of the process line of FIG. 1 showing the binder application portion and a still further embodiment of a foam application portion according to the present invention.

FIG. 4 shows a still further embodiment of applying a foam layer onto a wet, bindered non-woven web or mat 30B. This embodiment is similar to the embodiments described in FIGS. 2 and 3, except that the foam is applied using a different device. In the embodiment shown in FIG. 4 the foam applicator 78 is a counter clockwise rotating perforated drum 79, such as a Zimmer MAGNOROLL™ available from Zimmer Machinery of Spartanburg, S.C. 29304. The perforated drum 79 is made from a 16H perforated metal screen available from Stork Screens of America of Charlotte, N.C. 28269. The screen used has hexagonal shaped holes that are preferably so close together that foam dots formed on the wet, bindered mat 30B from foam extruded through the hexagonal holes flow together to form a continuous layer 42 of foam, although it is also permissible for some applications if the foam hexagonal dots do not quite flow together.

The perforated drum 79, extending entirely or partially across the width of the web 30 is supported with an axle 80 which can be moved up or down to move the outer surface of the drum 79 closer to or further away from the wet web 30B, and can also be moved up-line or down-line to optimize the position the foam application in a known manner.

A roller 81, supported on a movable shaft 82, is positioned on the interior of the drum 79 near the bottom of the drum 79 and rotates, preferably counterclockwise to force the foam 83 through the holes as they rotate to the bottom of the perforated drum 79 to form the foam layer 42 on the wet web 30B. Foam 83 is pumped in a controlled rate in a known manner as described above to, and distributed along the bottom portion of the perforated drum 79, by a manifold 84 and rectangular nozzle 85. Instead of using the roller 81 to force the foam through the perforated drum 79 a doctor or wiper blade or a contacting slot or feed nozzle can be used as is well known in the art of coating with a perforated drum.

Figure 5:
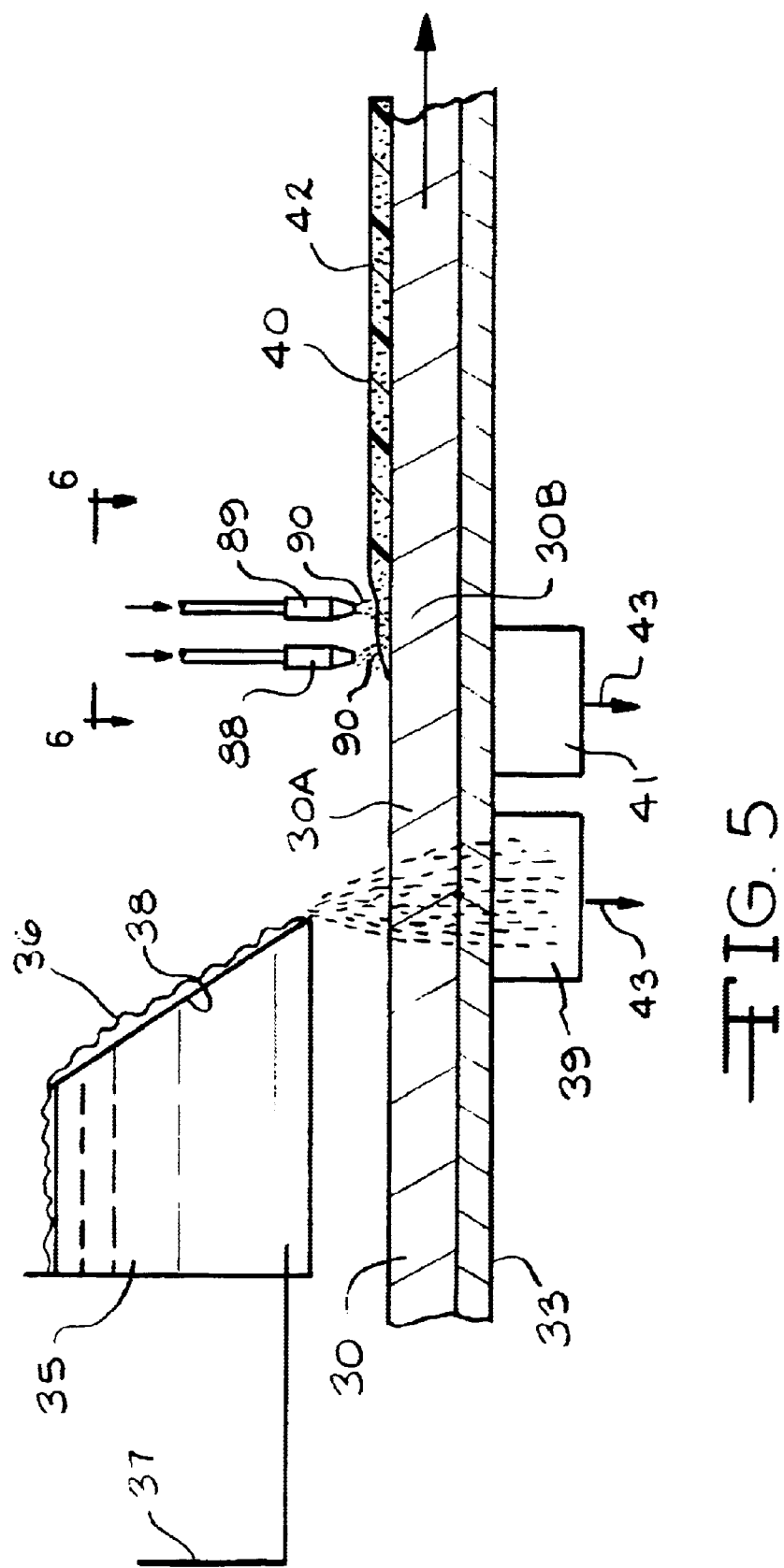
FIG. 5 is a schematic cross section of a portion of the process line of FIG. 1 showing the binder application portion and a still further embodiment of a foam application portion according to the present invention.

FIG. 5 shows a preferred method of applying a foam coating in-line to a wet non-woven fibrous web 30, preferably a wet, bindered non-woven fibrous web 30B. The system of FIG. 5 is similar to the systems of FIGS. 2, 3 and 4 described above except that the foam applicator is a plurality of nozzles 88,89 mounted above the wet web 30, preferably mounted above the wet, bindered web 30B. Foam is pumped in the method described above to a known manifold (not shown) which distributes the foam evenly to a plurality of nozzles 88,89 where the foam 90 is sprayed downwardly on the top surface of the wet web 30 or preferably onto the wet, bindered web 30B to form the foam layer 42. The foam 90 exits the nozzles 88,89 at a velocity that does not disturb the fibrous structure of the wet web 30 or the wet, bindered web 30B. Preferably the nozzles are spaced apart in two staggered rows as shown in FIG. 6 to provide even coverage of foam application onto the wet web 30 or the wet, bindered web 30B. The nozzles 88,89 are mounted on a rack (not shown) in a known manner that allows the nozzles to be moved up and down and up-line and down-line to permit optimization of the foam application to produce the desired foam layer 42. The preferred nozzles are Spraying Systems nozzles 8002 available from Spraying Systems Company, of Wheaton, Ill., with the foam being applied to the nozzles at a pressure of about 40 psi, but other nozzles can provide different coating weights and application widths. It is important to note that the nozzles are not generating the foam but merely spraying prepared foam delivered to the nozzles.

EXAMPLE 1

A wet web was formed in a conventional wet process on a laboratory wet former simulating a Voith Hydroformer™ line as used and disclosed in U.S. Pat. Nos. 4,637,496 and 5,772,846 using M 117 glass fibers one inch long. A fiber slurry was prepared in a well known manner by adding one inch long E glass type M 117 wet chop glass fiber from Johns Manville International, Inc. having a silane containing chemical sizing on the surface, as is well known, to a known cationic white water containing Natrosol™ thickening agent available from Aqualon, Inc. of Wilmington, Del., and a cationic surfactant C-61, an ethoxylated tallow amine available from Cytec Industries, Inc. of Morristown, N.J., as a dispersing agent to form a fiber concentration of about 0.8 weight percent. After allowing the slurry to agitate for about 5 minutes to thoroughly disperse the fibers, the slurry was metered into a moving stream of the same whitewater to dilute the fiber concentration to a concentration averaging about 0.05 to 0.06 weight percent before pumping the diluted slurry to a headbox of a pilot scale model of a Voith Hydroformer™ where a wet nonwoven mat was continuously formed.

The wet mat was removed from the forming wire and transferred to a second carrier wire running under a curtain coater binder applicator where an aqueous binder slurry was applied to the mat. The aqueous binder was a modified urea formaldehyde resin binder. This aqueous binder was made by adding adding to an aqueous urea formaldehyde resin, Georgia Pacific 2928 UF resin latex containing 54–56 wt. percent solids, about 7.5 wt. percent, based on the urea formaldehyde solids, of Duraset™ 827, available from Franklin International of Columbus, Ohio, and about 5 wt. percent of hexamethylene tetramine as a cross-linking agent.

The bindered mat was run over a suction box to remove excess binder and then was run under a pipe slot foam applicator where a foam was applied to the top surface. The foam precursor was an inorganic filled latex, UniBond™ 0946, available from UniChem™ Company of Haw River, N.C. The foam precursor had a total solids content of 30 percent and an unfoamed viscosity of 560 centipoise. The foam precursor was converted into a foam on a laboratory LESSCO™ foam unit to a blow ratio of about 30. This produced a stable, wet foam that produced less than two millimeters of liquid in the bottom of an lmhoff cone when allowed to stand for about 16 hours. The foam coated mat was then passed through an air dryer where it was dried and heated to about 350 degrees F. to cure the modified urea formaldehyde binder.

The resultant foam coated mat had a basis weight of 2.48 pounds per square (100 square feet). The basis weight of the fibrous mat substrate was about 2.32 pounds per square. The LOI of the foam coated mat was 27.4 weight percent while the LOI of the dry bindered substrate was 23.2 percent of the substrate or 21.7 percent of the foam coated mat. The foam content of the mat was about 5.7 weight percent. The other properties of the foam coated mat were as follows:

Dry tensile strength—106 pounds per 3 inch width

Hot wet tensile strength—66 pounds per 3 inch width

Air permeability of uncoated bindered mat—770 CFM

Air permeability of foam coated mat of example—550 CFM

EXAMPLE 2

Another wet web was formed in the same conventional wet process on a laboratory wet former simulating a Voith Hydroformer™ line as used and disclosed in U.S. Pat. Nos. 4,637,496 and 5,772,846 as used in Example 1. A fiber slurry was prepared in a well known manner by adding 0.75 inch long E glass type K 117 wet chop glass fiber from Johns Manville International, Inc. having a silane containing chemical sizing on the surface, as is well known, to a known cationic white water containing Natrosol™ thickening agent available from Aqualon, Inc. of Wilmington, Del., and a cationic surfactant C-61, an ethoxylated tallow amine available from Cytec Industries, Inc. of Morristown, N.J., as a dispersing agent to form a fiber concentration of about 0.8 weight percent. After allowing the slurry to agitate for about 5 minutes to thoroughly disperse the fibers, the slurry was metered into a moving stream of the same whitewater to dilute the fiber concentration to a concentration averaging about 0.05 to 0.06 weight percent before pumping the diluted slurry to a headbox of a pilot scale model of a Voith Hydroformer™ where a wet nonwoven mat was continuously formed.

The wet mat was removed from the forming wire and transferred to a second carrier wire running under a curtain coater binder applicator where an aqueous binder slurry was applied to the mat. The aqueous binder was a modified urea formaldehyde resin binder. This aqueous binder was made by adding to an aqueous urea formaldehyde resin, Georgia Pacific 2928 UF resin latex containing 54–56 wt. percent solids, about 7.5 wt. percent, based on the urea formaldehyde solids, of Duraset™ 827, available from Franklin International of Columbus, Ohio, and about 5 wt. percent of hexamethylene tetramine as a cross-linking agent.

The bindered mat was run over a suction box to remove excess binder and then was run under nozzles spraying foam as shown in FIG. 5 above where a foam was applied to the top surface. The nozzles were 8002 nozzles available from Spraying System Company of Wheaton, Ill. The nozzles were spaced about 3–3.5 inches apart with the bottom of the nozzles being about 6.5 inches above the to surface of the wet, bindered mat. The foam precursor was the same inorganic filled latex, 914-661-97-75 available from Noveon, Inc. of Cleveland, Ohio. The foam precursor had a total solids content of 35 percent and an unfoamed viscosity of 560 centipoise. The foam precursor was converted into a foam on a laboratory LESSCO™ foam unit to a blow ratio of about 10–15. This produced a stable, wet foam that produced less than two millimeters of liquid in the bottom of an Imhoff cone when the cone was filled with one liter of foam and allowed to stand for about 16 hours. The foam had a line pressure of about 40 psi to the nozzles and was applied at a rate to produce a dry foam addition of about 0.7 oz./sq. yd. The rate of foam addition to the web per unit area can be increased or decreased by changing the line speed, changing the foam pressure or by using larger or more application nozzles.

The foam coated mat was then passed through an air dryer where it was dried and heated to about 350 degrees F. to cure the modified urea formaldehyde binder.

The resultant foam coated mat had a basis weight of 2.7 pounds per square (100 square feet). The basis weight of the fibrous mat substrate was about 2.23 pounds per square. The LOI of the foam coated mat was 21 weight percent while the LOI of the dry bindered substrate was 16.1 percent of the substrate or 13.3 percent of the foam coated mat. The foam content of the mat was about 4.9 weight percent. The other properties of the foam coated mat were as follows:

Dry tensile strength—65 pounds per 3 inch width

Hot wet tensile strength—27 pounds per 3 inch width

Air permeability of uncoated bindered mat—659 CFM

Air permeability of foam coated mat of example—338 CFM

Thus it can be seen that while the foam coating reduced the permeability of the mat about 21 percent, the foam coating did not substantially reduce the permeability of the bindered mat and thus did not greatly inhibit its drying in an air dryer. This is important because if it were to substantially reduce the permeability, for example by about 50–75 percent or more, the line speed would have to be slowed substantially, increasing the manufacturing cost substantially.

EXAMPLE 3

Example 2 was duplicated except for the type of foam used and the basis weight of the finished mat which in this example was 1.3 pounds per/100 sq. ft. Also, a non-foam coated, bindered mat of the same kind as the bindered mat used to make the foam coated mat was made as a control. In this example a fluorpolymer was used. The fluorpolymer used was Sequapel NRL available from Omnova Solutions of Chester, S.C. The properties of fluorpolymer foam coated mat and the control mat were as follows:

Control mat LOI—27.6 percent

Foam coated mat LOI—29.1

Amount of foam addition—about 1.5 wt. percent of finished mat

Permeability of control mat—643

Permeability of foam coated mat—620

Dry tensile strength of control mat—87.1 lbs./3 in. width

Dry tensile strength of foam coated mat—73.1 lbs./3 in. width

Hot wet tensile of control mat—40.3 lbs./3 in. width

Hot wet tensile of foam coated mat—33.9 lbs/3 in. width

The foam coated mat was tested for repellency to a 50 percent concentration in water isopropyl alcohol using an accepted test and the foam coated mat passed the test while the control mat failed badly.

This inventive method of foam coating on-line in a wet forming mat process completely eliminates the need for the more costly off-line foam coating process currently being used. It also produces mats in which the foam coating prevents shedding of fibers from the face that is exposed after laminating to intermediate products or used to face products like gypsum board, insulation boards or blankets. It also presents a friendly surface, reducing abrasion or irritation caused by frequent handling of current glass mat faced products, particularly in hot, humid conditions. Further, this inventive method can also be used to coat the surface of a mat with a fire retardant or intumescent coating, a heat activating adhesive coating or other adhesive coating, colored coatings and other functional coatings by incorporating the functional ingredient(s) in the foam precursor or wet foam in a known manner. Incorporating the functional ingredient in the foam coating instead of the mat as was often the done in the past requires less functional ingredient further reducing the manufacturing cost.

The foam coated mats can be bonded to a gypsum wall board, insulating boards of various types and combustible substrates, like a wood product such as hardboard, particle board, chip board, oriented strand board or plywood. With gypsum board, the wet gypsum mix can be formed against the uncoated surface of the foam coated mat to bond to the fibrous web. In the case of combustible substrates the foam coated mat can be adhered with any known adhesive fire resistant adhesive with the uncoated web of the mat against the combustible material.

While the preferred embodiments of the invention have been disclosed in detail, other embodiments within the described invention and having other functional additives known or obvious to those skilled in the art are considered to be part of the present invention and are intended to be included in the invention claimed below.

What is claimed is:

1. A permeable, foam coated, fibrous, nonwoven mat made by a process in which an aqueous slurry containing fibers is continuously deposited onto the top surface of a moving permeable forming belt on a wet process mat machine, partially dewatered, followed by drying the wet web to produce a dry non-woven fibrous mat, the improvement comprising applying a foam or froth onto the wet web after said web has been partially dewatered and before drying, the foam or froth having a blow ratio of at least about 12, the foam forming less than 5 millimeters of liquid in the bottom of an Imholf cone after 16 hours from the time of filling the cone to a one liter mark and the foam having a viscosity of at least about 200 centipoise, the foam or froth being of a type that breaks down fairly quickly such that the coated web has enough permeability to permit drying air to penetrate the coated web and applying said foam at a rate to produce a dry mat having a coating on one face and having a permeability of at least about 338 CFM/sq. ft.

2. A permeable, foam coated, fibrous, nonwoven mat made by the process described in claim 1 wherein an aqueous binder is first applied to the wet, partially dewatered web and the wet, bindered web is passed over a suction box to reduce the binder content to a desired level prior to applying the foam or froth onto the top surface of the wet web.

3. A permeable, foam coated, fibrous, nonwoven mat made by the process described in claim 2 wherein at least the majority are glass fibers and said foam is applied at a rate to produce a dry mat having a permeability of at least about 350 CFM/sq. ft.

4. A permeable, foam coated, fibrous, nonwoven mat made by the process described in claim 3 wherein the amount of liquid formed in the bottom of the Imhoff cone is less than about 2 millimeters.

5. A laminate comprising a first material layer bonded to a second layer of a nonwoven fibrous mat, the mat having an exposed foam coating and made by the process described in claim 2.

6. The laminate of claim 5 wherein the first layer is gypsum board.

7. The laminate of claim 5 wherein the first layer is a light-weight insulating material.

8. A permeable, foam coated, fibrous, nonwoven mat made by the process described in claim 1 wherein said foam is applied at a rate to produce a dry mat having a permeability of at least about 500 CFM/sq. ft.

9. A permeable, foam coated, fibrous, nonwoven mat made by the process described in claim 1 wherein said foam has a blow ratio between about 15 and about 30.

10. A permeable, foam coated, fibrous, nonwoven mat made by the process described in claim 1 wherein the amount of liquid formed in the bottom of the Imhoff cone is less than about 2 millimeters.

11. A laminate comprising a first material layer bonded to a second layer of a nonwoven fibrous mat, the mat having an exposed foam coating and made by the process described in claim 1.

12. A permeable, foam coated, fibrous, nonwoven mat made by the process comprising making a permeable fibrous mat on a wet process mat machine in which an aqueous slurry containing fibers is continuously deposited onto the top surface of a moving permeable forming belt, partially dewatered, followed by applying an excess of an aqueous binder, removing excess aqueous binder to form a wet, bindered web and drying the wet, bindered web to produce a dry non-woven fibrous mat, the improvement comprising applying a foam or froth onto the wet, bindered web after said web, the foam or froth having a blow ratio of at least about 12, the foam forming less than 5 millimeters of liquid in the bottom of an Imhoff cone after 16 hours from filling and a viscosity of at least about 200 centipoise, the foam or froth being of a type that breaks down fairly quickly such that the coated web has enough permeability to permit drying air to penetrate the coated web and applying said foam at a rate to produce a dry, mat having a coating on one face, the mat having a permeability of at least about 338 CFM/sq. ft.

13. A permeable, foam coated, fibrous nonwoven mat made by the process described in claim 12 and wherein at least the majority of fibers are glass fibers.

14. A permeable, foam coated, fibrous, nonwoven mat made by the process described in claim 13 and wherein said foam is applied at a rate to produce a dry mat permeability of at least about 350 CFM/sq. ft.

15. A permeable, foam coated, fibrous, nonwoven mat made by the process described in claim 13 and wherein said foam is applied at a rate to produce a dry mat having a permeability of at least about 500 CFM/sq. ft.

16. A permeable, foam coated, fibrous, nonwoven mat made by the process described in claim 13 wherein the amount of liquid formed in the bottom of an Imhoff cone filled with foam and allowed to age is less than about 2 millimeters.

17. A permeable, foam coated, fibrous, nonwoven mat made by the process described in claim 13 wherein the foam has a blow ratio of at least about 25.

18. A permeable, foam coated, fibrous, nonwoven mat made by the process described in claim 12 wherein the foam has a blow ratio of at least about 25.

19. A laminate comprising a first layer of material bonded to a second layer of a nonwoven fibrous mat, the hat having an exposed foam coating and made by the process comprising making a permeable fibrous mat on a wet process mat machine in which an aqueous slurry containing fibers is continuously deposited onto the top surface of a moving permeable forming belt, partially dewatered, followed by applying an excess of aqueous binder, removing excess aqueous binder to form a wet, bindered web and drying the wet, bindered web to produce a dry non-woven fibrous mat, the improvement comprising applying a foam or froth onto the wet, bindered web after said web, the foam or froth having a blow ratio of at least about 12, the foam forming less than 5 millimeters of liquid in the bottom of an lmhoff cone after 16 hours from filling and a viscosity of at least about 200 centipoise, the foam or froth being of a type that breaks down fairly quickly such that the coated web has enough permeability to permit drying air to penetrate the coated web and applying said foam at a rate to produce a dry, mat having a coating on one face, the mat having a permeability of at least about 338 CFM/sq. ft.

20. A laminate comprising a first layer of material bonded to a second layer of a nonwoven fibrous mat, the mat having an exposed foam coating and made by the process described in claim 19 and wherein at least the majority of fibers are glass fibers and said foam is applied at a rate to produce a dry mat having a permeability of at least about 350 CFM/sq. ft.

21. The laminate of claim 20 wherein the first layer is gypsum board.

22. The laminate of claim 20 wherein the first layer is a light-weight insulating material.

* * * * *